(12) United States Patent
Morimoto et al.

(10) Patent No.: US 11,608,386 B2
(45) Date of Patent: Mar. 21, 2023

(54) DRIED CELLULOSE FIBERS, CELLULOSE FIBER-RESIN COMPOSITE, AND MOLDED ARTICLE

(71) Applicant: SUGINO MACHINE LIMITED, Uozu (JP)

(72) Inventors: Yuki Morimoto, Uozu (JP); Atsushi Minemura, Uozu (JP); Kazuya Nagata, Imizu (JP); Kazuaki Sanada, Imizu (JP)

(73) Assignee: SUGINO MACHINE LIMITED, Uozu (JP)

( * ) Notice: Subject to any disclaimer, the term of this patent is extended or adjusted under 35 U.S.C. 154(b) by 164 days.

(21) Appl. No.: 16/773,291

(22) Filed: Jan. 27, 2020

(65) Prior Publication Data

US 2020/0247909 A1 Aug. 6, 2020

(30) Foreign Application Priority Data

Feb. 6, 2019 (JP) .............................. JP2019-019373

(51) Int. Cl.
*C08B 1/00* (2006.01)
*C08L 23/12* (2006.01)
*C08L 77/06* (2006.01)

(52) U.S. Cl.
CPC ................. *C08B 1/00* (2013.01); *C08L 23/12* (2013.01); *C08L 77/06* (2013.01); *C08L 2205/025* (2013.01); *C08L 2205/03* (2013.01); *C08L 2205/16* (2013.01)

(58) Field of Classification Search
CPC ...................................................... C08B 1/00
See application file for complete search history.

(56) References Cited

U.S. PATENT DOCUMENTS

| 4,503,117 A * | 3/1985 | Murray .................. D21H 17/00 |
| | | 428/311.71 |
| 9,222,222 B2 * | 12/2015 | Dodd ..................... D21H 13/02 |
| 2005/0247236 A1 * | 11/2005 | Frey ........................ D01D 5/003 |
| | | 106/311 |
| 2021/0198455 A1 * | 7/2021 | Miyoshi ................. C08B 15/02 |

FOREIGN PATENT DOCUMENTS

| CN | 108884272 A | 11/2018 |
| JP | 3867117 B2 | 1/2007 |
| JP | 4260045 B2 | 4/2009 |
| JP | 2012201852 A | 10/2012 |
| JP | 2012224960 A * | 11/2012 |
| JP | 2013133363 A * | 7/2013 |
| JP | 5592696 B2 | 9/2014 |
| JP | 5675066 B2 | 2/2015 |
| JP | 6005470 B2 | 10/2016 |

* cited by examiner

*Primary Examiner* — Leigh C Maier
*Assistant Examiner* — Everett White
(74) *Attorney, Agent, or Firm* — United IP Counselors, LLC

(57) ABSTRACT

Provided are dried cellulose fibers that are satisfactory dispersible in a resin when the cellulose fibers are mixed with the resin and can improve physical properties such as tensile elastic modulus and tensile strength of a resin composite, a cellulose fiber-resin composite including the cellulose fibers, and a molded article. The dried cellulose fibers include cellulose fibers, the cellulose fiber-resin composite includes the dried cellulose fibers, and the molded article is formed from the cellulose fiber-resin composite. The cellulose fibers have an average fiber diameter of 0.1 μm more and 20 μm or less and have a hemicellulose content of 50% or less in constituent sugar components. The dried cellulose fibers have a water content of 10% by mass or less.

19 Claims, 6 Drawing Sheets

US 11,608,386 B2

DRIED CELLULOSE FIBERS, CELLULOSE FIBER-RESIN COMPOSITE, AND MOLDED ARTICLE

CROSS-REFERENCE TO RELATED APPLICATIONS

This application claims the benefit of priority to Japanese Patent Application No. 2019-019373, filed on Feb. 6, 2019, the entire contents of which are hereby incorporated by reference.

BACKGROUND

1. Technical Field

The present invention relates to dried cellulose fibers, a cellulose fiber-resin composite, and a molded article.

2. Description of the Background

Cellulose is a main component of plant cell walls and functions to support plant bodies together with coexisting lignin and hemicellulose. This resource is produced and accumulated in the largest amount on the earth and is expected to be used efficiently. The cellulose has been used in various industrial fields, which include the use as a filler. The filler is a particulate or fibrous substance that is added to a resin, rubber, paint, or other materials in order to improve strength or functionality or to reduce cost.

In the development of polymer materials, the combination of a functional filler and a polymer is a crucial factor. Differences in shape of fillers greatly affect physical properties of a composite material. In particular, acicular/fibrous fillers have such characteristics as to give high mechanical/thermal reinforcement effect, high conduction efficiency, and damping performance.

Amorphous or spherical fillers have such characteristics as easy processability, isotropic physical properties, a small reduction in toughness, and a small deformation after molding.

Specifically, cellulose as a natural polymer in which glucoses are linked through β-1,4-glycoside bonds has a high aspect ratio and should be useful as a fibrous filler.

Glass fibers as a filler for a fiber-reinforced resin are comparatively inexpensive, are easily processed by molding, drilling, or the like, achieve high reinforcement effect, and have been variously used in a wide range of fields. The glass fibers, however, have a density of 2.55 g/cm$^3$, is heavy relative to resins, and have a disadvantage in applications intended to achieve light weights.

In recent years, CFRP that is a composite of carbon fibers and a resin has been practically used as aircraft members. Carbon fibers (PAN carbon fibers) have a density of 1.82 g/cm$^3$ and are a lighter material having higher strength than those of glass fibers. The CFRP has been studied for applications mainly in a transport machinery field.

A reinforced resin as a composite of glass fibers or carbon fibers and a resin is, however, poor in recyclability and cannot be disposed of by burning. To address this problem, fibers derived from natural products such as cellulose and chitin/chitosan that are relatively easily available and are environmentally friendly have been studied as an alternative material for a long time. Cellulose has a density of 1.5 g/cm$^3$, is lighter than glass fibers and carbon fibers, and has a relatively high rigidity. Hence, the cellulose has been drawing attention as a possible fiber reinforcement filler, and some cellulose composite resins are placed on the market. Unlike glass fibers and carbon fibers, cellulose can be burned and has thermal recyclability. In recent studies, nanofibers having a fiber diameter of 100 nm or less, called nanocellulose or cellulose nanofibers, are added to a resin to achieve a reinforcement effect.

Cellulose is a natural product, and the fiber diameter thereof varies in plant species. Typical plant fibers have a fiber diameter of 20 to 50 μm, and the original average fiber diameter is extremely difficult to process and adjust to a smaller diameter.

For example, Japanese Patent No. 3867117 (hereinafter called "Patent Document 1") discloses preparation of a cellulose having a fiber diameter of 20 μm or less as an additive for rubber and resin.

Japanese Patent No. 5592696 (hereinafter called "Patent Document 2") discloses a method of reducing a crystallization peak time to improve crystallinity by adding cellulose fibers to an aliphatic polyester resin.

Japanese Patent No. 4260045 (hereinafter called "Patent Document 3") discloses use of cellulose fibers as a dehydration auxiliary, and the cellulose has a fiber diameter of 10 to 30 μm.

Japanese Patent No. 6005470 (hereinafter called "Patent Document 4") discloses, as a method of producing a resin containing cellulose fibers, a method of uniformly dispersing fibrillated cellulose fibers in a resin with no aqueous medium.

Japanese Patent No. 5675066 (hereinafter called "Patent Document 5") discloses a resin composition containing microcellulose fibers and a method for producing the composition.

BRIEF SUMMARY

The cellulose disclosed in examples in Patent Document 1 is not fibrous but is flat cellulose particles, and no cellulose fibers having a fiber shape are produced.

The cellulose having advantages in Patent Document 2 is flat cellulose fibers, which have an average diameter of more than 20 μm.

The cellulose fibers in Patent Document 3 contains water and are intended to be used in water. In other words, the production of dried cellulose fibers having an average fiber diameter of 0.1 to 20 μm is not disclosed.

The production method according to Patent Document 4 cannot produce only dried cellulose fibers having an average fiber diameter of 0.1 to 20 μm and is intended to perform polymerization reaction while fibers are dispersed in a solvent, and the product cannot be added to and mixed with a thermoplastic resin, a rubber, or a similar material as a typical filler.

In Patent Document 5, cellulose fibers specifically prepared in examples have an average fiber diameter of less than 0.1 μm, and the production of dried cellulose fibers having an average fiber diameter of 0.1 to 20 μm is not substantially disclosed.

As described above, the production of dried cellulose fibers having an average fiber diameter 0.1 to 20 μm is not specifically disclosed in the related art. Accordingly, it is not known that dried cellulose fibers maintaining such a fiber shape exhibit excellent characteristics when the cellulose fibers are mixed with a resin.

Meanwhile, it is known that cellulose fibers can be fibrillated by a water jet, a grinder, a high-pressure homogenizer, a bead mill, or a similar means to give cellulose microfibers having an average fiber diameter of 20 nm. A technique of using chemical treatment in combination to fibrillate cellulose to have a fiber diameter of about 3 nm is also known. By these methods, nanofibers having a fiber diameter of 0.1 μm or less can be produced as a water dispersion. However, when the obtained water dispersion is simply dried, a phenomenon called cornification is caused, and cellulose undergoes hydrogen bonding during removal of water to form a robust macrostructure. In particular, cellulose fibers having an average fiber diameter of 0.1 μm or less are likely to aggregate during drying, and thus it is extremely difficult to give dried cellulose fibers in a fibrous state.

In view of the above circumstances, the present invention has an object to provide dried cellulose fibers capable of being satisfactory dispersed in a resin and of improving physical properties such as tensile elastic modulus and tensile strength when the cellulose fibers are mixed with the resin, a cellulose fiber-resin composite including the dried cellulose fibers, and a molded article.

The inventors of the present invention have carried out intensive studies to achieve the object, have found that the object can be achieved by dried cellulose fibers having an average fiber diameter of 0.1 μm or more and 20 μm or less and having a hemicellulose content of 50% or less in constituent sugar components of the cellulose fibers, and have completed the present invention.

The present invention includes the following aspects.

Dried cellulose fibers comprising:
cellulose fibers having an average fiber diameter of 0.1 μm or more and 20 μm or less and having a hemicellulose content of 50% or less in constituent sugar components; and
10% by mass or less of water.

A cellulose fiber-resin composite comprising the dried cellulose fibers and a thermoplastic resin.

A molded article formed from the cellulose fiber-resin composite.

The present invention enables the production of dried cellulose fibers that are satisfactory dispersed in a resin when the cellulose fibers are mixed with the resin and can improve physical properties such as tensile elastic modulus and tensile strength of a resin composite. The present invention further enables the production of a cellulose fiber-resin composite including the dried cellulose fibers and a molded article.

DETAILED DESCRIPTION

1. Dried Cellulose Fibers

Figure 1:
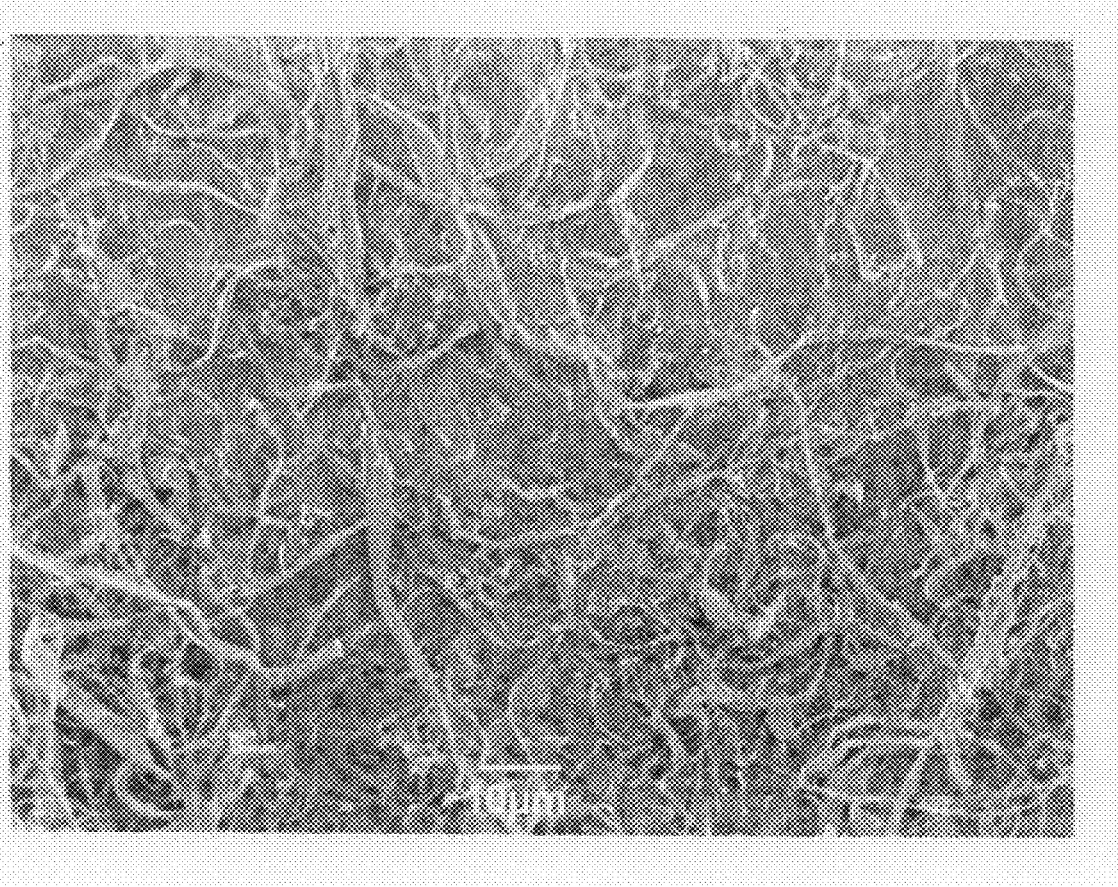
FIG. 1 is an electron microscope image of dried cellulose fibers in Production Example 1.

An embodiment (present embodiment) of dried cellulose fibers of the present invention will now be described in detail.

The present embodiment is dried cellulose fibers including cellulose fibers and water. The cellulose fibers have an average fiber diameter of 0.1 μm or more and 20 μm or less, and the cellulose fibers have a hemicellulose content of 50% or less in the constituent sugar components. The dried cellulose fibers have a water content of 10% by mass or less. In the description, cellulose fibers containing 10% by mass or less of water are called "dried cellulose fibers".

In the present embodiment, the cellulose fibers preferably have an average fiber diameter of 0.1 μm or more and 20 μm or less. Fibers having a larger fiber diameter than that of nanofibers (what is called cellulose nanofibers) can satisfactory maintain fiber shapes. In other words, when cellulose fibers are dried, cornification may be caused to reduce the maintainability of fiber shapes, but the present embodiment of the invention can suppress this phenomenon. In addition, the present embodiment enables the production of dried cellulose fibers capable of greatly improving tensile strength or tensile elastic modulus of a fiber-resin composite prepared by mixing the cellulose fibers with a resin. The cellulose fibers preferably have a hemicellulose content of 50% or less in the constituent sugar components. Cellulose fibers having a hemicellulose content within the range can maintain a fibrillated, dried state even having an average fiber diameter of 0.1 μm or more and 20 μm or less.

Cellulose fibers having an average fiber diameter of less than 0.1 μm unfortunately causes the cornification, and cellulose fibers having an average fiber diameter of more than 20 μm are difficult to greatly improve tensile strength or tensile elastic modulus of a fiber-resin composite prepared by mixing the cellulose fibers with a resin. The cellulose fibers preferably have an average fiber diameter of 0.5 μm or more and more preferably 1 μm or more. The cellulose fibers preferably have an average fiber diameter of 17 μm or less and more preferably 10 μm or less.

The average fiber diameter of cellulose fibers can be determined by a method described in examples.

In a conventional method of producing nanofibers, for example, when cellulose fibers are controlled to have an average fiber diameter of 0.1 μm or more and 20 μm or less, the number of crushing times, the pressure, or the rotation rate can be adjusted. When a cellulose material containing a large amount of hemicellulose is used, the material includes portions likely to give nanofibers and portions unlikely to give nanofibers, and unfortunately the resulting fibers have a broad fiber diameter distribution. In order to give fibers having an average fiber diameter of 0.1 μm or more and 20 μm or less, it is preferred to use a cellulose having a glucose content of 50% or more, or a cellulose having a hemicellulose content of 50% or less, when the total constituent sugar amount of the cellulose fibers is 100% determined by constituent sugar analysis.

Cellulose fibers having a hemicellulose content of more than 50% fail to give the fibrillated, dried cellulose fibers described above. The hemicellulose content is preferably 35% or less, more preferably 30% or less, and even more preferably 5% or less. Cellulose fibers having a lower hemicellulose content is preferred.

The hemicellulose content can be determined by a method described in examples.

In order to prepare cellulose fibers having a hemicellulose content of 50% or less, for example, kraft pulp or cotton having a low hemicellulose content can be used as the material cellulose. Some materials can be subjected to mercerization of treating cellulose fibers with an alkali, giving a hemicellulose content of 50% or less.

In the description, the hemicellulose is a general term of polysaccharides that are other than cellulose but are contained in wood pulp and non-wood pulp. The main component of pulp is cellulose, and the cellulose is crystalline polysaccharides in which only glucoses are linearly polymerized. The hemicellulose is polysaccharides containing monosaccharides such as xylose, mannose, arabinose, galactose, glucuronic acid, and galacturonic acid and having branched chains. The hemicellulose is amorphous polysaccharides having a lower molecular weight than that of the cellulose. Typical examples of the hemicellulose include polysaccharides such as xylan, arabinoxylan, mannan, glucomannan, and glucuronoxylan.

The cellulose fibers pertaining to the present embodiment preferably have cellulose I crystalline form. The cellulose I crystalline form has a higher crystal elastic modulus than those of other crystal structures (cellulose II, III, and IV structures) and thus has an advantage in producing cellulose fibers having a high elastic modulus, a high strength, and a low linear expansion coefficient.

Cellulose fibers having crystal structure I can be determined by observing typical peaks around two scan angles, $2\theta=14$ to $17°$ and $2\theta=22$ to $23°$, in a diffraction profile (wide angle x-ray diffraction image) recorded by wide angle x-ray diffraction measurement.

The cellulose fibers preferably have a viscosity average molecular weight of 100,000 or more, more preferably 120,000 or more, and even more preferably 200,000 or more. Cellulose fibers having a viscosity average molecular weight of 100,000 or more can more satisfactory allow a fiber-resin composite to have excellent physical properties. The viscosity average molecular weight is preferably 300,000 or less in practice.

The viscosity average molecular weight of cellulose fibers can be determined by a method described in examples.

The dried cellulose fibers pertaining to the present embodiment preferably further include a surfactant. The dried cellulose fibers including a surfactant can have higher dispersibility in a resin.

The surfactant used in the present embodiment can be anionic surfactants, nonionic surfactants, and mixtures thereof capable of being dissolved or dispersed in water or a water-soluble alcohol such as ethanol and methanol, and specific examples include, but are not necessarily limited to, stearic acid derivatives, oleic acid derivatives, glycerol derivatives, and polyglycerol derivatives.

The stearic acid is a saturated fatty acid contained in the largest amount in the animal and vegetable fats and is widely distributed as an oil and fat component in nature. Specific examples of the stearic acid derivative include stearic acid, stearamide, aluminum stearate, magnesium stearate, sodium stearate, calcium stearate, barium stearate, PEG stearate, PEG-glyceryl stearate, PG stearate, ascorbyl stearate, isocetyl stearate, glycol stearate, stearic acid glyceride, glyceryl stearate, cholesteryl stearate, diethanolamide stearate, stearamidoethyl diethylamine, ethyl stearate, vinyl stearate, sucrose stearate, sorbitan stearate, sodium stearate, batyl stearate, butyl stearate, cetyl stearate, methyl stearate, hexyldecyl stearate, stearyl stearate, glyceryl distearate, isohexadecyl stearate, glyceryl monostearate, 12-hydroxystearic acid, 2-ethylhexyl stearate, glyceryl monoisostearate, N,N'-ethylene-bis-stearamide, and stearic acid esters.

Specific examples of the oleic acid derivative include oleic acid, oleic anhydride, ethyl oleate, butyl oleate, methyl oleate, oleyl oleate, sodium oleate, glycidyl oleate, copper (II) oleate, cholesteryl oleate, glycerol dioleate, glyceryl monooleate, oleic acid esters, oleic acid butyl ester, oleic acid propyl ester, dibutylammonium oleate, potassium oleate, oleic acid ethyl ester, N,N-diethanol oleamide, 4-methylumbelliferyl oleate, trimethylolpropane trioleate, sulfosuccinimidyl oleate sodium, N,N'-ethylene-bis-oleamide, and 5-bromo-4-chloro-3-indoxyl oleate.

Specific examples of the glycerol derivative and the polyglycerol derivative include glycerol, diglycerol, PPG-9 diglyceryl ether, PPG-14 polyglyceryl-2 ether, diglycerol monocaprylate, POP(9) polyglyceryl ether, POP(14) polyglyceryl ether, POP(24) polyglyceryl ether, POE(13) polyglyceryl ether, POE(20) polyglyceryl ether, POE(30) polyglyceryl ether, POE(40) polyglyceryl ether, polyglycerol, glycerol fatty acid ester, polyglyceryl monoisostearate, polyglyceryl diisostearate, polyglyceryl monolaurate, decaglyceryl monomyristate, polyglyceryl monooleate, polyglyceryl monostearate, polyglyceryl distearate, polyglyceryl condensed ricinoleic acid ester, diglyceryl tetraisostearate, polyglyceryl pentaisostearate, adipic acid, diethylene glycol, ethylhexylglycerol, octoxyglycerol, ozonized glycerol, cyclohexylglycerol, thioglycerol, bis-dioleoyl glycerophosphoglycerol 2Na, hexylglycerol, polyglycerol-4, polyglycerol-6, polyglycerol-10, polyglycerol-20, polyglycerol fatty acid ester, diglycerol fatty acid ester, polyoxyethylene polyglyceryl ether, glycerol fatty acid ester, monoglyceride, acetylated monoglyceride, organic acid monoglyceride, medium chain fatty acid monoglyceride, polyglycerol fatty acid ester, sorbitan acid fatty acid ester, and propylene glycolic acid fatty acid ester.

Examples of the other glycerol derivatives include glycerol esters such as a lauric acid ester, a myristic acid ester, a caprylic acid ester, a behenic acid ester, an erucic acid ester, and a condensed ricinoleic acid ester.

The surfactant is preferably at least one selected from the group consisting of stearic acid derivatives, oleic acid derivatives, glycerol derivatives, and polyglycerol derivatives from the viewpoint of further improving dispersibility of the dried cellulose fibers in a resin. Of them, the polyglycerol derivatives are preferred, and polyglyceryl condensed ricinoleic acid ester consisting of polyglycerol and condensed ricinoleic acid is more preferred.

The surfactant is preferably contained in an amount of 1 part by mass or more and 30 parts by mass or less relative to 100 parts by mass of the cellulose fibers (solid content). When the surfactant is contained in an amount of 1 part by mass or more, an aggregation suppressing effect on cellulose fibers is likely to be achieved. When contained in an amount of 30 parts by mass or less, the surfactant is not excess relative to cellulose fibers, and consequently, discoloration or insufficient drying of the cellulose fibers is prevented.

The content of the surfactant is preferably 3 parts by mass or more and more preferably 5 parts by mass or more relative to 100 parts by mass of the cellulose fibers (solid content). The content is preferably 20 parts by mass or less and more preferably 15 parts by mass or less.

The dried cellulose fibers pertaining to the present embodiment as described above can be produced, for example, as follows: such a cellulose material as described below is subjected to a machine processing step or a similar step to give a cellulose fiber aqueous dispersion, and the dispersion is subjected to drying treatment or a similar treatment.

The "aqueous" of the cellulose fiber aqueous dispersion means that a solvent or a dispersion medium contains 50% by mass or more of water. The dispersion may be a water dispersion containing only water as the solvent or the dispersion medium or may contain any organic substance that is derived from additives or the like and can be dissolved in water.

Cellulose Material

The material cellulose used for production of the cellulose fiber aqueous dispersion preferably has cellulose I crystalline form. Examples of the material cellulose include celluloses of woody plants (conifers, broadleaf frees), herbaceous plants, kraft pulp, cotton, ramie, algae, sea squirts, and bacteria. Of them, kraft pulp or cotton (cotton cellulose) is preferred. As for constituent sugars of the cellulose, a material having a low hemicellulose content is preferred, and a material having a high cellulose purity is preferred. Specifically, when the total constituent sugar amount determined by constituent sugar analysis is 100%, a material having a glucose content of 50% or more is preferred. In other words, cellulose fibers having a hemicellulose content of 50% or less based on the constituent sugar components are preferred. These cellulose fibers may be a single type or a mixture of two or more types. The cellulose material preferably has a fibrous shape, a powder shape, a chip shape, or a flake shape or may have a mixture of them from the viewpoint of convenience of handling properties.

(Machine Processing Step

A machine processing step is the step of fibrillating cellulose fibers having a fiber diameter of 20 to 50 μm to give an average fiber diameter of 0.1 to 20 μm. The fibrillating is a step of disentangling and raising fibers. Before the machine processing, a cellulose material is preferably diluted and dispersed with water to give a dispersion having a cellulose concentration of 0.1 to 30% by mass. For the fibrillating, a 1 to 20% by mass dispersion is more preferably used. In particular, a dispersion having a cellulose concentration of 1 to 20% by mass does not have an excessively high viscosity, and cellulose fibers are efficiently fibrillated.

In the machine processing step, a crushing apparatus capable of performing wet crushing can be used. Examples of the crushing apparatus include a wet crusher, a high-pressure homogenizer, an ultra-high-pressure homogenizer, a grinder (millstone grinder), a high-speed fibrillating apparatus, a ball mill, a bead mill, a disk refiner, a conical refiner, a twin-screw kneader, a vibrating mill, a homomixer, an ultrasonic disperser, and a beater.

As the apparatus capable of fibrillating fibers while the fiber length is maintained, a wet crusher is effective and preferred. Fibrillation of fibers by using the wet crusher is specifically the following fibrillation method: fibers are allowed to collide with a collision hard body or with each other by high-pressure injecting at 100 to 245 MPa through an injection nozzle having a diameter of 0.1 to 0.8 mm. The fibrillation technique enables continuous fibrillation at high pressure by not only shear force generated when a dispersion fluid is allowed to pass through a narrow flow path at high pressure and low speed, for example, by using a commercially available high-pressure homogenizer but also collision force or cavitation generated when a dispersion fluid is allowed to collide with a collision hard body or with each other. To prepare more uniform cellulose fibers by the technique, the collision is repeatedly performed preferably 1 to 30 passes, more preferably 1 to 20 passes, where one pass means that collision treatment is performed once.

In the step, the material cellulose fibers are preferably fibrillated to have a fiber diameter of 0.1 μm or more and 20 μm or less. The fibrillated cellulose fibers as above are prevented from aggregating by strong hydrogen bonds when dried. The fibrillated cellulose fibers aggregate weakly in a drying step but can be fibrillated through a dry crushing step into a fibrous form having an average fiber diameter of 0.1 μm or more and 20 μm or less. In other words, the cellulose fibers in the cellulose fiber aqueous dispersion of the embodiment can maintain the average fiber diameter even in a dry condition.

Addition and Mixing of Surfactant

To mix the cellulose fiber aqueous dispersion of the embodiment with a surfactant, an anionic or nonionic surfactant capable of being dissolved or dispersed in water or a water soluble alcohol such as ethanol and methanol is added to a cellulose fiber aqueous dispersion prepared through the machine processing step, and the whole is homogeneously stirred and mixed, for example, by a commercially available propeller stirrer, a blender, a ribbon mixer, a revolution/rotation stirring degasser, or a planetary mixer. Alternatively, a surfactant can be added to cellulose fibers before the machine processing step, and then the whole can be subjected to wet crushing.

The cellulose fibers of the cellulose fiber aqueous dispersion pertaining to the present embodiment and prepared as above preferably have a median diameter of 10 μm or more, more preferably 15 μm or more, and even more preferably 20 μm or more from the viewpoint of improving physical properties of a fiber-resin composite of a resin and the cellulose fibers. From the viewpoint of satisfactory maintaining the dispersibility of the cellulose fibers in a resin, the median diameter is preferably 80 μm or less, more preferably 70 μm or less, and even more preferably 60 μm or less. The median diameter also indicates the dispersibility of cellulose fibers in an aqueous dispersion, and cellulose fibers having a median diameter within the above range should maintain satisfactory dispersibility in a resin.

The median diameter of cellulose fibers in a cellulose fiber aqueous dispersion can be determined by a method described in examples.

The content (solid concentration) of the cellulose fibers in a cellulose fiber aqueous dispersion is preferably 0.1% by mass or more, more preferably 1% by mass or more, even more preferably 10% by mass or more, and specifically preferably 15% by mass or more from the viewpoint of efficient production of dried cellulose fibers. The upper limit is practically about 30% by mass.

A typical cellulose fiber aqueous dispersion has a solid concentration of at most about 10% by mass in practice, but the cellulose fiber aqueous dispersion of the embodiment has good dispersibility of cellulose fibers and thus can have a comparatively high solid concentration.

Such a cellulose fiber aqueous dispersion as above can be dried by a known drying treatment (drying step) to give dried cellulose fibers. From the viewpoint of further improving the dispersibility of dried cellulose fibers in a resin, the drying step may be followed by a crushing step.

Drying Step

The drying is not limited to particular methods and can be performed by using a commercially available drying apparatus. Examples of the drying apparatus include a spray dryer using a spray drying method, a dryer using a vacuum drying method, a flash dryer using a flash drying method, a hot-air dryer using hot air, a steam dryer using steam, a spin dryer using centrifugal force, a vibration dryer using vibration force, a fluidized-bed dryer using a fluidized bed drying method, a drum dryer using a rotating heat drum with a surface onto which a substance is allowed to adhere and dried, and a freeze dryer in which a frozen slurry dispersion is dried in vacuo. By the drying treatment, the amount of water contained in the dried cellulose fibers (water content) is reduced to 10% by mass or less. In accordance with a method described in examples, the dried cellulose fibers can have a water content of 10% by mass or less.

The water content can be determined, for example, by using a heat drying type moisture meter.

Crushing Step

The crushing step is not specifically limited and can be performed by a commercially available crushing apparatus. Examples of the crushing apparatus include a roller mill with which the gravity/centrifugal force of a roller is applied to a table-like or bowl-like crushing container to perform compressive crushing, a jet mill with which a compressed/high-pressure air or a high-pressure gas is jetted at several atmospheres or more, the resulting jet stream accelerates material particles, and the particles are allowed to collide/impact to be crushed, a hammer mill with which a hammer rotated at high speed applies impact to supplied particles for crushing, a pin mill with which two disks each having several tens of pins on the surface are rotated at high speed to crush an object, a tumbling mill with which a crushing medium is placed in a rotating cylinder having a horizontal axis so as to fill ⅓ of the volume of the cylinder, and an object is crushed by rotation, a vibration mill with which a crushing medium is placed in a mill having a cylindrical shape or a trough shape, and then the mill is vibrated to move the medium for crushing, a planetary mill with which a container containing an object together with a crushing medium is rotated and revolved, and the resulting collision force crushes the object, an attritor with which balls having a size of about 3 to 10 mm and rod-like stirring arms are used to crush an object, a bead mill with which beads as a medium are placed in a container, and an agitator is rotated to allow the beads to collide for crushing, and an airflow crusher with which an air flow generated by rotating impellers causes counter collision of a material with each other, and the material is crushed.

The dried cellulose fibers produced as above have been fibrillated to have an average fiber diameter of 0.1 μm or more and 20 μm or less and are in a dry state, thus have good handling properties when mixed with a resin or the like, and can be in a resin while maintaining satisfactory dispersibility. Hence, the physical properties such as tensile elastic modulus and tensile strength can be improved.

2. Cellulose Fiber-Resin Composite, Molded Article

A cellulose fiber-resin composite pertaining to the present embodiment includes the dried cellulose fibers and a thermoplastic resin. The composite preferably contains 5 or less aggregates of the dried cellulose fibers in 1 cm$^2$, and the aggregates preferably have a maximum diameter of 200 μm or more. When 5 or less such dried cellulose fiber aggregates are contained in 1 cm$^2$, satisfactory dispersibility of the dried cellulose fibers in a thermoplastic resin is maintained, and intended physical properties are likely to be achieved.

The number of the aggregates can be determined from a resin press sheet mixed with cellulose fibers by a method described in examples.

Thermoplastic Resin

Examples of the resin to be mixed include thermoplastic resins having a melting temperature of 300° C. or less and specifically include polyolefins such as polyethylene and polypropylene, polystyrene, AS resins (acrylonitrile styrene), ABS resins, polyvinyl chloride, vinyl chloride resins, acrylic resins, methacryl resins, PET resins, polyethylene terephthalate, PVA resins, polyvinyl alcohol, polyvinylidene chloride, polyvinylidene fluoride, nylon 6, nylon 66, nylon 11, nylon 12, acetal resins, polyacetal, polycarbonate, PBT resins, polybutylene terephthalate, polyphenylene sulfide, polyetherimide, polysulfone, polychlorotrifluoroethylene, fluorocarbon resins, polyamideimide, acetylcellulose, cellulose acetate, nitrocellulose, cellulose nitrate, cellulose propionate, and ethyl cellulose. These thermoplastic resins can be used singly or in combination of two or more of them. Of them, the thermoplastic resin is preferably at least one selected from the group consisting of polyolefin resins and polyamide resins.

In the cellulose fiber-resin composite pertaining the present embodiment, the content of the dried cellulose fibers (cellulose fibers) depends on the type of a resin but is preferably 0.3% by mass or more, more preferably 0.5% by mass or more, and even more preferably 1% by mass or more from the viewpoint of achieving preferred physical properties of the fiber-resin composite. The content is preferably 50% by mass or less and more preferably 40% by mass or less.

The cellulose fiber-resin composite pertaining to the present embodiment may contain known additives (such as a compatibilizer, a heat stabilizer, and an antioxidant) as long as the effects are not impaired.

To produce the cellulose fiber-resin composite, first, the dried cellulose fibers are mixed with a resin by a known method. The mixture is then preferably subjected to dry blending as pre-dispersion by using a stirrer or mixer such as a Henschel Mixer, a blender, and a Tri-Mix. Subsequently, the resulting mixture can be kneaded by using any kneader at a predetermined rotation rate and temperature for a certain time, giving a cellulose fiber-resin composite.

The cellulose fiber-resin composite pertaining to the present embodiment preferably has a tensile elastic modulus of 1,550 MPa or more and a tensile strength of 36 MPa or more in accordance with JIS K7161. When having physical properties within the range, the cellulose fiber-resin composite can be highly practical. The cellulose fiber-resin composite more preferably has a tensile elastic modulus of 2,000 MPa or more and a tensile strength of 38 MPa or more.

Use of such a cellulose fiber-resin composite as above enables the production of a molded article pertaining to the present embodiment. In other words, the molded article pertaining to the present embodiment is formed from the cellulose fiber-resin composite of the present invention. The molding method can be appropriately a known molding method such as extrusion molding, injection molding, press molding, cast molding, and solvent casting.

3. Additional Components of Dried Cellulose Fibers, Cellulose Fiber-Resin Composite, and Molded Article The resin to be mixed with the dried cellulose fibers containing cellulose fibers as a filler is not limited to the vinyl resins such as polyolefin and the polycondensed resins such as polyamide, and a thermoplastic resin having a melting point of 300° C. or less is applicable. A transparent substrate (resin) such as an epoxy resin having substantially the same refractive index as that of cellulose can be mixed to produce a transparent film or a transparent resin having new functions. In particular, the dried cellulose fibers pertaining to the present embodiment can be mixed with a polymer capable of forming hydrogen bonds, such as a phenol resin, polyethylene glycol, polyethylene terephthalate, and polyvinyl alcohol, to change the strength or surface properties of such a polymer.

The dried cellulose fibers pertaining to the present embodiment can be mixed with a biodegradable resin such as polylactic acid, polybutylene succinate, and polycaprolactone to improve properties including strength and heat resistance of such a resin.

According to the present embodiment, when cellulose fibers are subjected to surface modification (chemical modification), for example, when cellulose fibers are acetylated to have hydrophobicity, the resulting cellulose fibers can be mixed with a resin having properties other the above properties, including a hydrophobic resin such as an acrylic resin.

The present embodiment also enables the production of cosmetics (a sunscreen) and liquid crystal substrates that advantageously have optical properties of fine cellulose fibers and the production of filters that advantageously have nano-order pores among cellulose fibers. By replacing the hydroxy groups of cellulose with any functional groups, separation/filtration materials having different properties/functions can be produced. By controlling the diameter of cellulose fibers, the size of pores can be changed. By making cellulose fibers into fine fibers, the fine fibers have a larger specific surface area and thus are preferably used as an adsorbent. When the fine fibers are dried, the resulting film is a porous membrane controlled to have pores on a micro level and thus can be used as a support for immobilization of a biocatalyst such as an enzyme, a chromatography support for separation, purification, and similar purposes, or a cell culture substrate. When the dried cellulose fibers pertaining to the present embodiment are applied onto the surface of an acoustic diaphragm including a speaker, a uniform hard film is formed, and similar effects can be achieved. To achieve excellent acoustic properties, a hard material that has high strength and high elastic modulus and wholly integrally vibrates as a rigid body is intended to be produced. The dried cellulose fibers pertaining to the present embodiment can be made into fine fibers while maintaining high crystallinity, and thus can be used as a material of an acoustic diaphragm having high elastic modulus.

By combining chitosan fibers as a natural cationic polymer with cellulose fibers as an anionic polymer, electrostatic attraction between the anionic charge and the cationic charge should give stiffening effect, and stronger composite fibers can be produced. Paper strength is most affected by adhesion strength among fibers and depends on hydrogen bonds between hydroxy groups of cellulose. Hence, in order to improve the paper strength, the number of hydrogen bonds can be increased, and this mechanism can be applied to a paper strength enhancer.

The dried cellulose fibers pertaining to the present embodiment can be carbonized by high-temperature treatment in the absence of oxygen (in an atmosphere of an inert gas such as nitrogen and argon). In other words, carbon fibers derived from biomass can be produced. Porous carbon containing a large number of small pores on a micro level has been used as a deodorant, a decolorant, or a water purification filter. In the present embodiment, bio-carbon nanofibers produced by carbonization of natural fibers can also be applied to such fields. Porous carbon not only captures odor or soil molecules in small pores thereof but also can capture ions (charged atoms or molecules) in collaboration with the power of electricity. The porous carbon can also release the captured charges, and this mechanism has been used to develop a capacitor having large capacity. Such a capacitor can also be used as auxiliary power supply for fuel-cell vehicles or as a storage for storing excess electric power during the night and thus has attracted much attention. The capacitance of an electric double layer capacitor depends on the charge amount stored in the electric double layer, and thus an electrode having a larger surface area can give a larger capacitance. Hence, activated carbon having a high conductivity and a high specific surface area has been used as an electrode material. In the present embodiment, bio-carbon fibers produced by carbonization of natural fibers are mesoporous activated carbon that has a high specific surface area and is controlled to have nanopores, and thus can be used as an electrode material that dramatically improves the capacitance of an electric double layer capacitor or the like.

The dried cellulose fibers pertaining to the present embodiment can also be applied as a detergent for clothing. Cellulose and cellulose derivatives have been used as an anti-soil redeposition agent in detergents for a long time. The anti-soil redeposition agent functions to prevent soil components removed from laundry by a surfactant in a detergent from adhering to clothes again and is an important technique as water-saving washing machines are widely used. In the present embodiment, microfibers made from cellulose have a higher specific surface area and should achieve effective reattachment prevention effect as compared with conventional cellulose materials. In addition, cellulose has been used in various fields, and thus the embodiment should be applied to cosmetic materials, drug release carriers, food additives, coating agents for medical drugs, heat insulating materials, catalysts, and the like.

In the above description, the dried cellulose fibers pertaining to the present embodiment have been described, and biomass-derived materials having a fiber structure as with the cellulose, such as chitin, chitosan, silk, and carboxymethyl cellulose, can achieve similar effects.

EXAMPLES

The present invention will next be specifically described with reference to examples, but the invention is not limited to them.

Various measurements and observations in examples and comparative examples were performed in the following procedures.

Average Fiber Diameter of Cellulose Fibers in Water Dispersion

For fibers having a fiber diameter of 1 μm or more, a water dispersion was sufficiently diluted and dispersed so as to isolate each fiber, and then a prepared sample was observed under a microscope (manufactured by Keyence Corporation, apparatus name: VHX-500). The fiber diameters of 50 fibers were measured, and the average was calculated as the average fiber diameter. For fibers having a fiber diameter of less than 1 μm, a water dispersion was sufficiently diluted and dispersed so as to isolate each fiber, then the resulting dispersion was dropped on a mica flake and was air-dried, and the dried sample was observed under a scanning probe microscope (manufactured by Shimadzu Corporation, SPM-9700). The fiber diameters of 50 fibers were measured, and the average was calculated as the average fiber diameter.

Constituent Sugar Analysis: Hemicellulose Content

Constituent sugars were analyzed by using a reducing sugar analyzer. In this method, a sample was separated by a column, then sugar reaction (Maillard reaction) is conducted with boric acid and arginine at 150° C., and the product is analyzed by fluorescence detection. The reducing sugar analysis system used included a controller CBM-20A, a liquid feed pump LC-20AD, an autosampler SIL-20AC, a column oven CTO-20AC, a fluorescence detector RF-20Axs, and a chemical reaction chamber CRB-6A, manufactured by Shimadzu Corporation. The used sample contained water after fibrillation treatment. After heat drying, 0.03 g of a dried sample was weighed and was immersed in 300 μl of 70% sulfuric acid for 1 hour. Next, 8.4 ml of pure water was added, and the whole was heated at 110° C. and maintained in a reduced pressure environment for 60 minutes. Then, the sample was filtered through fiberglass, and pure water was added to give a total volume of 10 ml. To 1 part by volume of the sample, 2 parts by volume of barium hydroxide solution having a concentration of 40% was added, and the sulfuric acid in the sample solution was salted out.

Then, the solution was filtered through a membrane filter having a pore size of 0.2 μm, and the filtrate was analyzed. For the liquid chromatographic analysis, columns, Asahipack NH2P-50 4E (250 mm L.×4.6 mm i.d.; S/NJ17T0192) and Asahipack NH2P-50G 4 (10 mm L.×4.0 mm i.d.; S/NP2810002), were used. The analysis conditions were as follows: the mobile phase used was acetonitrile/water/phosphoric acid=85/15/0.3 (v/v/v); the column temperature was 45° C.; the flow rate was 0.8 ml/min; and the injection volume was 10 μl. The detection conditions were as follows: the, detector was RF-20Ax; and the reaction solution was a mixed aqueous solution of 5 g/L arginine, 0.4 mol/L boric acid, and 0.2 mol/L potassium hydroxide. The analysis was performed as follows: the reaction temperature was 150° C.; the reaction coil was 2 m×0.5 mm; and the detection wavelengths were an excitation wavelength of 320 nm and a fluorescence wavelength of 470 nm. Relative to the total sugar amount of each cellulose fiber, the contents (%) of rhamnose, xylose, arabinose, fructose, mannose, glucose, and cellobiose were determined. The total content (%) of the detected rhamnose, xylose, arabinose, fructose, and mannose as the constituent sugars of hemicellulose was calculated as the hemicellulose content.

Identification of Cellulose I Crystalline Form

CuKα rays (A=1.542) passed through a Ni filter at an acceleration voltage of 40 kV and an acceleration current of 150 mA with an X-ray diffractometer (manufactured by Rigaku Corporation, apparatus name: a rotating anode X-ray generator, Rotaflex RU-200B) were used for analysis with a transversal goniometer for X-ray powder diffraction manufactured by Rigaku Corporation. The diffracted intensities were recorded at diffraction angles 2θ ranging from 5° to 35°. The presence of the cellulose I crystalline form was determined whether typical peaks arising from the cellulose I crystalline form were observed around two scan angles, 2θ=14 to 17° and 2θ=22 to 23°, in the diffraction profile (wide angle x-ray diffraction pattern) recorded by the wide angle x-ray diffraction pattern measurement of cellulose fibers.

Molecular Weight Measurement

The molecular weight of cellulose fibers was determined by viscometry. Specifically, a cellulose fiber water dispersion was freeze-dried to give a dry powder sample, and then the cellulose fiber sample was dissolved in a copper ethylenediamine solution. An Ostwald viscometer was used to measure a relative viscosity of the solution relative to the solvent, then the relative viscosity was used to determine an intrinsic viscosity, and the molecular weight (viscosity average molecular weight) of the cellulose fibers was calculated.

Measurement of Particle Size Distribution

To simply determine the fibrillation degree of fibers, a median diameter was measured. The median diameter (particle size at a cumulative frequency of 50%) was determined with a laser diffraction/scattering particle size distribution analyzer (manufactured by Horiba, Ltd., apparatus name: LA-300). Before the measurement, dispersion treatment was performed by sonication for 5 minutes, and the particle size distribution was measured.

Fiber Shape Determination after Drying: Observation Under Electron Microscope

To determine the shape of dried cellulose fibers, the fiber appearance observed under an electron microscope (manufactured by JEOL Ltd., apparatus name: JCM-5700). A sample in which fibers were individually fibrillated into a fibrous form was evaluated as A; a sample in which no fibrous form was formed and a plurality of fibers wholly aggregate to give aggregates was evaluated as D; between the above samples, a sample in which some fibers aggregate to partially form aggregates, and the aggregates account for less than 50% was evaluated as B; and a sample in which the partial aggregates account for not less than 50% was evaluated as C. Evaluations A and B were acceptance.

Average Fiber Diameter after Drying

A sample determined to have a fibrous form by fiber shape determination after drying was subjected to fiber diameter measurement to determine the fiber diameter of dried cellulose fibers by using an electron microscope (manufactured by JEOL Ltd., apparatus name: JCM-5700). The fiber diameters of 50 fibers were measured, and the average was calculated as the average fiber diameter.

Production Example 1

Cotton derived from raw cotton was used as a material cellulose to prepare a cellulose fiber water dispersion.

First, the cotton was crushed with a cutting mill (manufactured by Fritsch, Pulverisette 15) to give cotton powder cellulose. The cotton powder cellulose was dispersed in ion-exchanged water to give a dispersion having a concentration of 10% by mass, and the dispersion was subjected to fibrillation treatment 10 times with a wet crusher (manufactured by Sugino Machine, Starburst) to fibrillate the fibers. Then, constituent sugar analysis was performed to determine the hemicellulose content in the constituent sugars of the cellulose fibers. The cellulose fiber water dispersion was freeze-dried to give a dry powder sample. The average molecular weight thereof was determined by viscometry, and existence or non-existence of the cellulose I crystalline form was examined by X-ray diffraction analysis. Next, the 10% by mass cellulose fiber water dispersion was mixed with a condensed ricinoleic acid ester (product name: CRS-75, manufacturer: Sakamoto Yakuhin Kogyo Co., Ltd.) as a surfactant in an amount of 10 parts by mass relative to 100 parts by mass of the cellulose solid content, and the whole was thoroughly stirred and mixed.

The average fiber diameter and the particle size distribution of the cellulose fibers in the cellulose fiber water dispersion were determined. The results are shown in Table 1.

The mixture was then dried by heating at 80° C. for 4 hours with stirring to remove water, giving granular, dried cellulose fibers. The granular, dried cellulose fibers were crushed with a pin mill (manufactured by Nara Machinery Co., Ltd., apparatus name: Sample Mill), giving dried cellulose fibers. The crushing was performed at a rotation rate of 16,000 rpm with a 0.2-mm screen. Whether the obtained dried cellulose fibers had a fibrous form was examined with an electron microscope (FIG. 1). The fiber shape after drying was determined, and a sample having a fibrous form was subjected to average fiber diameter measurement. The results are shown in Table 1.

TABLE 1

| | Production Example 1 |
|---|---|
| Average fiber diameter of cellulose fibers in water dispersion (μm) | 1.2 |
| Hemicellulose content (%) | 1 |
| Cellulose I crystalline form | observed |
| Viscosity average molecular weight of cellulose fibers | 229,000 |
| Median diameter (μm) | 24 |
| Amount of surfactant to 100 parts by mass of cellulose fibers (parts by mass) | 10 |
| Crashing | performed |
| Fiber shape evaluation | A |
| Average fiber diameter after drying (μm) | 1.3 |

Table 1 and FIG. 1 reveal that dried cellulose fibers having a fiber diameter of several micrometers can be obtained.

Production Example 2

Figure 2:
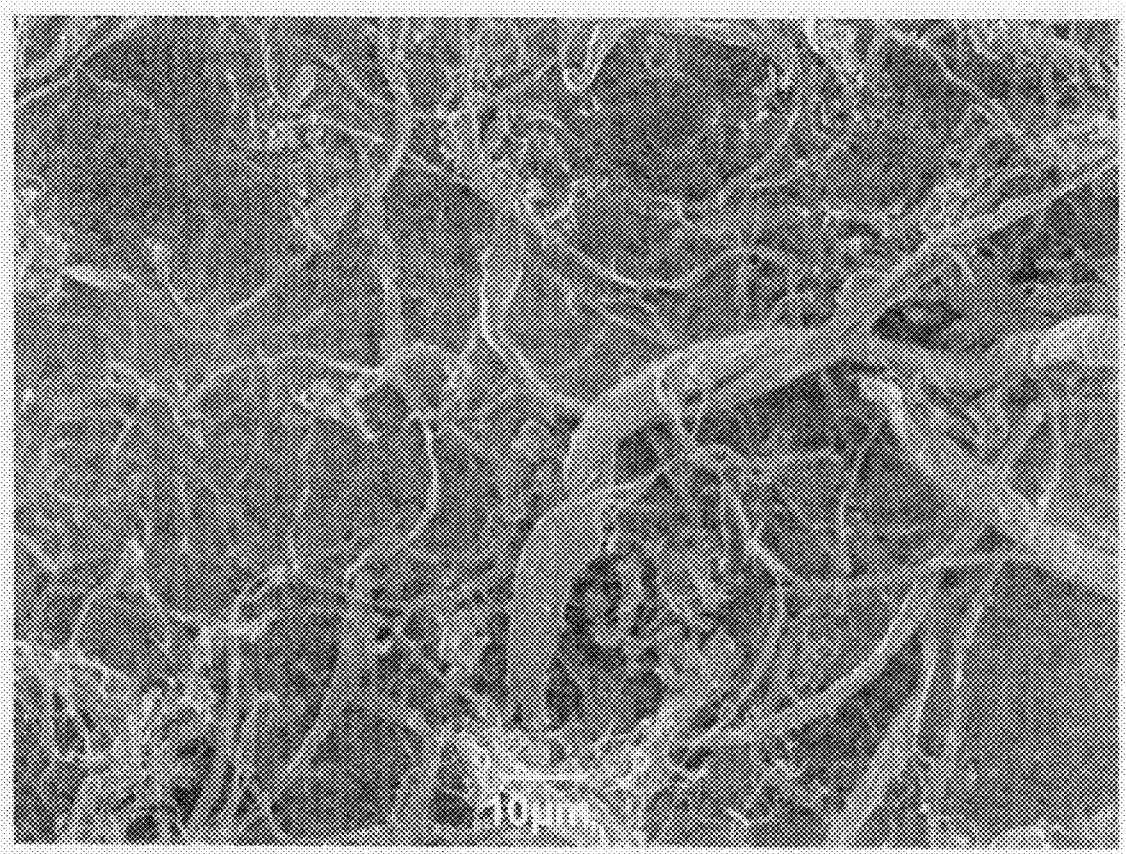
FIG. 2 is an electron microscope image of dried cellulose fibers in Production Example 2.

A 10% by mass cellulose fiber water dispersion prepared in a similar manner to that in Production Example 1 was not mixed with a condensed ricinoleic acid ester (product name: CRS-75, manufacturer: Sakamoto Yakuhin Kogyo Co., Ltd.) as a surfactant but was dried by heating in a similar manner to that in Production Example 1, giving dried granules. The dried granules were crushed with a pin mill in a similar manner to that in Production Example 1, giving dried cellulose fibers. Whether the obtained dried cellulose fibers had a fibrous form was examined with an electron microscope (FIG. 2). The fiber shape after drying was determined, and a sample having a fibrous form was subjected to average fiber diameter measurement. The results are shown in Table 2.

Production Example 3

Figure 3:
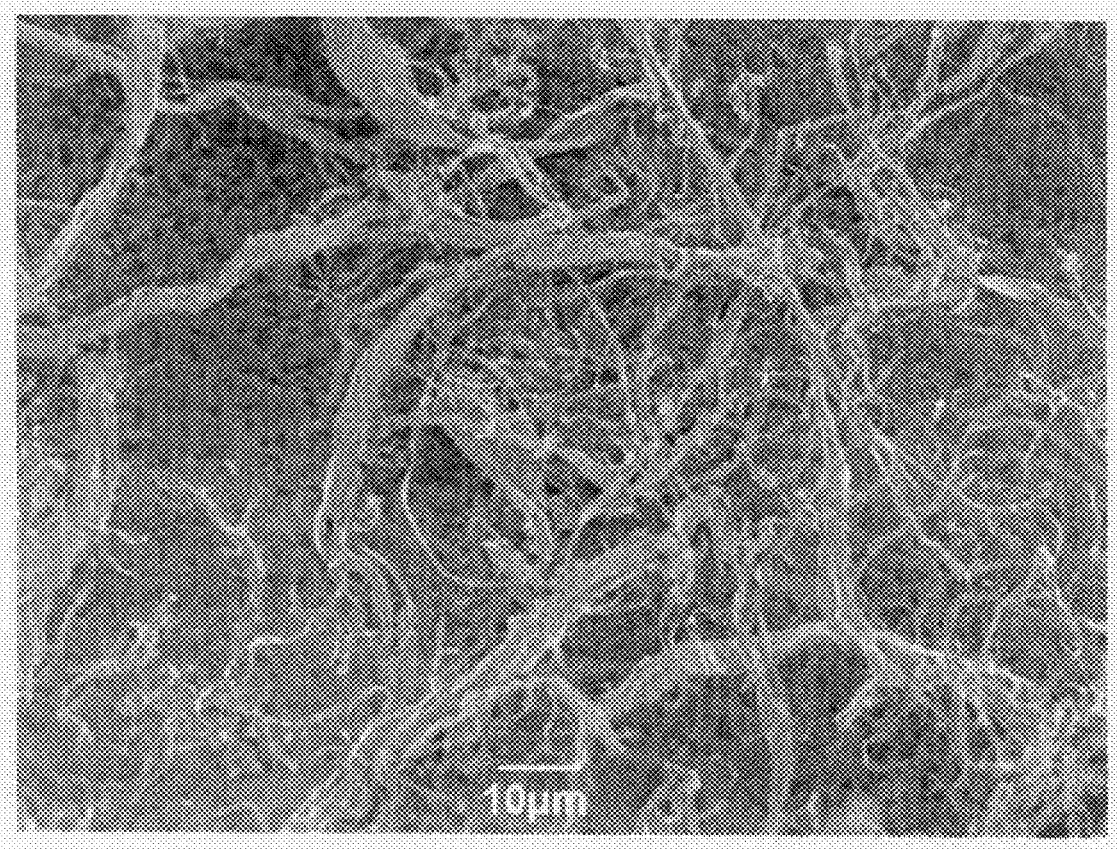
FIG. 3 is an electron microscope image of dried cellulose fibers in Production Example 3.

A 10% by mass cellulose fiber water dispersion prepared in a similar manner to that in Production Example 1 was mixed with a condensed ricinoleic acid ester (product name: CRS-75, manufacturer: Sakamoto Yakuhin Kogyo Co., Ltd.) as a surfactant in an amount of 1 part by mass relative to 100 parts by mass of the cellulose fibers (solid content), and the whole was thoroughly stirred and mixed. The mixture was then dried by heating in a similar manner to that in Production Example 1, giving dried granules. The dried granules were crushed with a pin mill in a similar manner to that in Production Example 1, giving dried cellulose fibers. Whether the obtained dried cellulose fibers had a fibrous form was examined with an electron microscope (FIG. 3). The fiber shape after drying was determined, and a sample having a fibrous form was subjected to average fiber diameter measurement. The results are shown in Table 2.

Production Example 4

Figure 4:
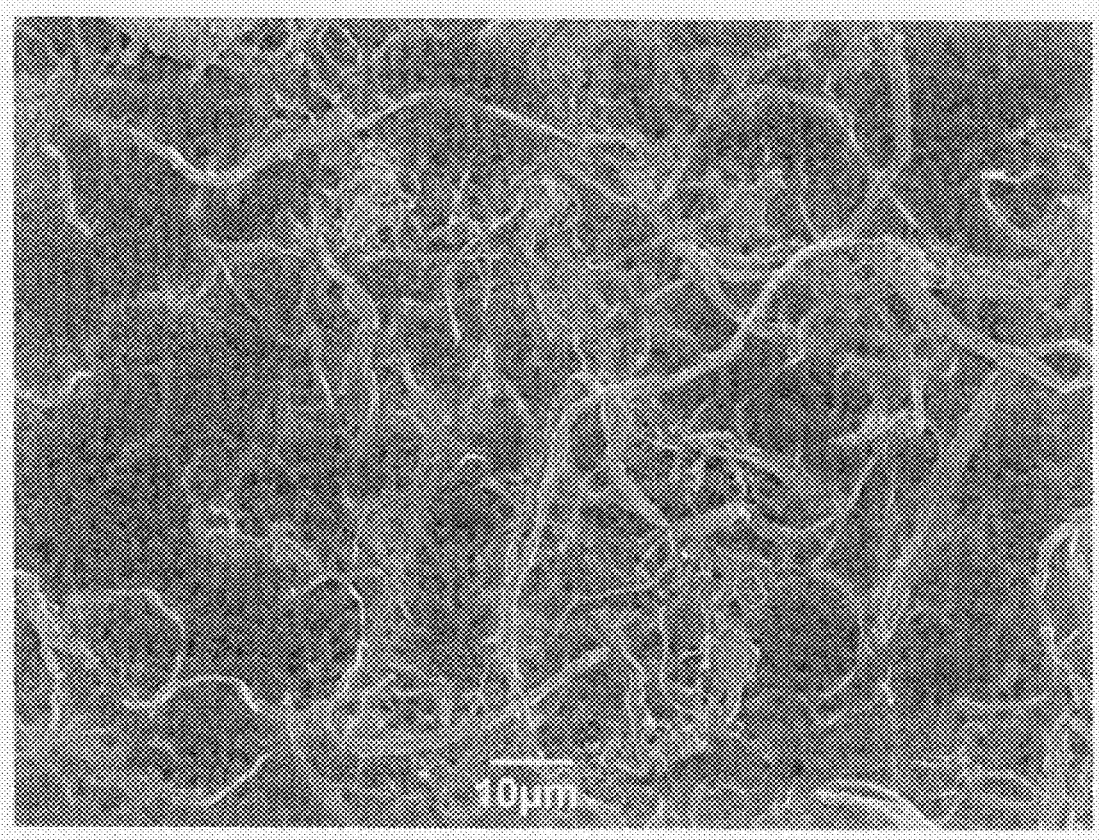
FIG. 4 is an electron microscope image of dried cellulose fibers in Production Example 4.

A 10% by mass cellulose fiber water dispersion prepared in a similar manner to that in Production Example 1 was mixed with a condensed ricinoleic acid ester (product name: CRS-75, manufacturer: Sakamoto Yakuhin Kogyo Co., Ltd.) as a surfactant in an amount of 3 parts by mass relative to 100 parts by mass of the cellulose fibers (solid content), and the whole was thoroughly stirred and mixed. The mixture was then dried by heating, giving dried granules. The dried granules were crushed with a pin mill in a similar manner to that in Production Example 1, giving dried cellulose fibers. Whether the obtained dried cellulose fibers had a fibrous form was examined with an electron microscope (FIG. 4). The fiber shape after drying was determined, and a sample having a fibrous form was subjected to average fiber diameter measurement. The results are shown in Table 2.

Production Example 5

Figure 5:
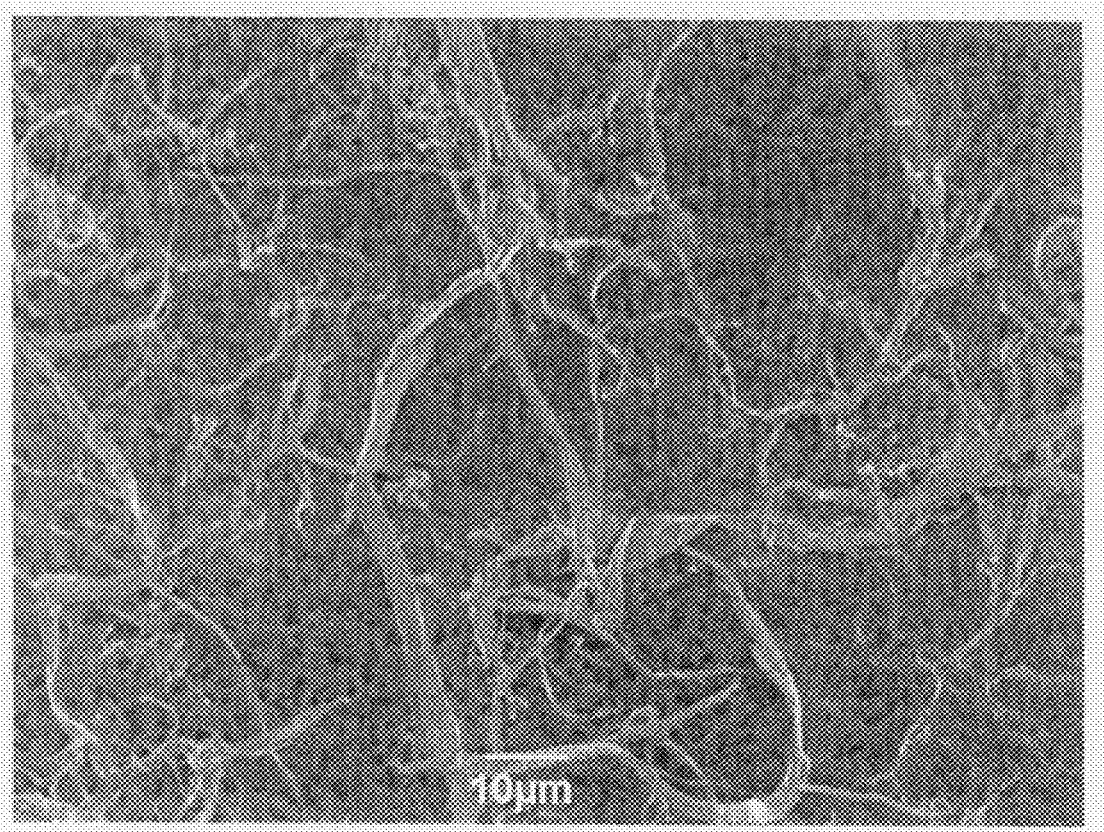
FIG. 5 is an electron microscope image of dried cellulose fibers in Production Example 5.

A 10% by mass cellulose fiber water dispersion prepared in a similar manner to that in Production Example 1 was mixed with a condensed ricinoleic acid ester (product name: CRS-75, manufacturer: Sakamoto Yakuhin Kogyo Co., Ltd.) as a surfactant in an amount of 5 parts by mass relative to 100 parts by mass of the cellulose solid content, and the whole was thoroughly stirred and mixed. The mixture was then dried by heating, giving dried granules. The dried granules were crushed with a pin mill in a similar manner to that in Production Example 1, giving dried cellulose fibers. Whether the obtained dried cellulose fibers had a fibrous form was examined with an electron microscope (FIG. 5). The fiber shape after drying was determined, and a sample having a fibrous form was subjected to average fiber diameter measurement. The results are shown in Table 2.

Production Example 6

Figure 6:
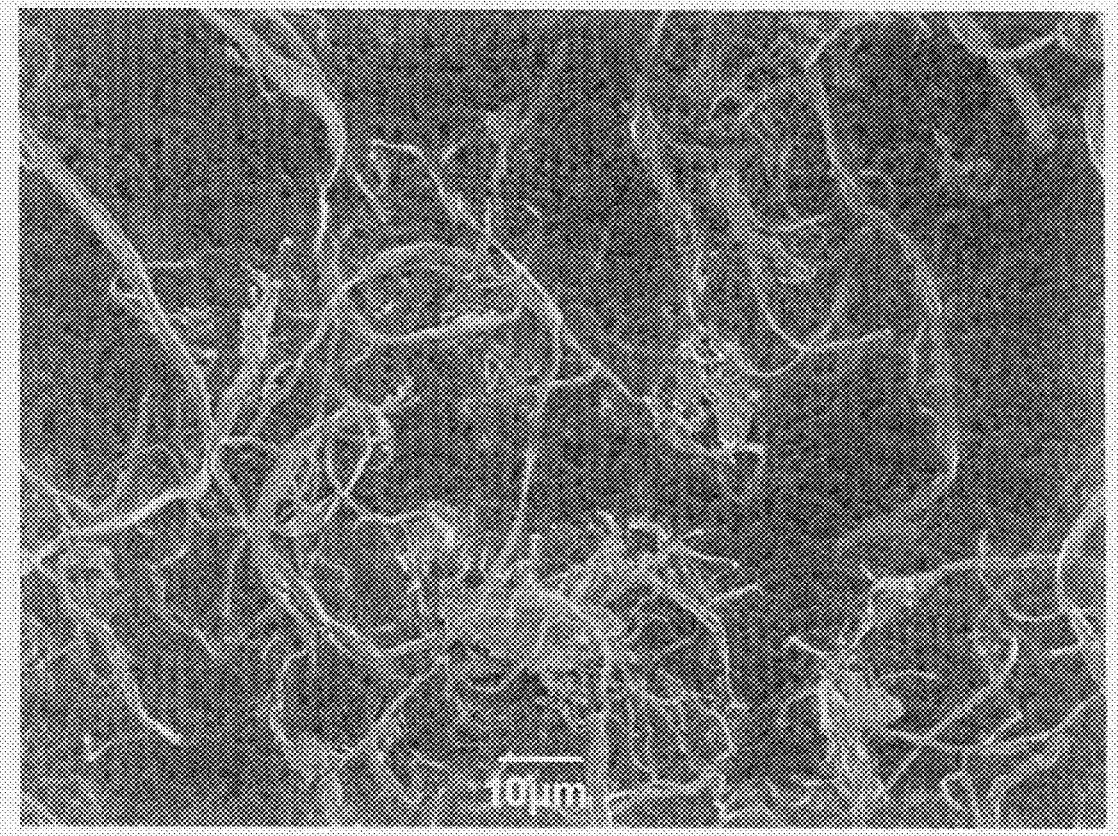
FIG. 6 is an electron microscope image of dried cellulose fibers in Production Example 6.

A 10% by mass cellulose fiber water dispersion prepared in a similar manner to that in Production Example 1 was mixed with oleic acid (product name: oleic acid, manufacturer: FUJIFILM Wako Pure Chemical Corporation) as a surfactant in an amount of 5 parts by mass relative to 100 parts by mass of the cellulose fibers (solid content), and the whole was thoroughly stirred and mixed. The mixture was then dried by heating, giving dried granules. The dried granules were crushed with a pin mill in a similar manner to that in Production Example 1, giving dried cellulose fibers. Whether the obtained dried cellulose fibers had a fibrous form was examined with an electron microscope (FIG. 6). The fiber shape after drying was determined, and a sample having a fibrous form was subjected to average fiber diameter measurement. The results are shown in Table 2.

TABLE 2

| | Production Example 2 | Production Example 3 | Production Example 4 | Production Example 5 | Production Example 1 | Production Example 6 |
|---|---|---|---|---|---|---|
| Average fiber diameter of cellulose fibers in water dispersion (μm) | | | 1.2 | | | |
| Hemicellulose content (%) | | | 1 | | | |
| Cellulose I crystalline form | | | observed | | | |
| Viscosity average molecular weight of cellulose fibers | | | 229,000 | | | |
| Median diameter (μm) | | | 24 | | | |
| Amount of surfactant to 100 parts by mass of cellulose fibers (parts by mass) | 0 | 1 | 3 | 5 | 10 | 5 |
| Fiber shape evaluation | B | A | A | A | A | A |
| Average fiber diameter after drying (μm) | 8.0 | 1.8 | 1.4 | 1.1 | 1.3 | 2.6 |

The results reveal that the amount of the surfactant relative to 100 parts by mass cellulose fibers is preferably 1 part by mass or more and more preferably 3 parts by mass or more. The results reveal that addition of the surfactant facilitates fibrillation of cellulose fibers by dry crushing.

The dried cellulose fibers obtained in the above production examples had cellulose fiber lengths not less than 10 times the corresponding fiber diameters.

Dispersibility Evaluation of Cellulose Fibers in Resin

For the dispersibility evaluation, a resin press sheet mixed with cellulose fibers was observed under a microscope (manufactured by Keyence Corporation, apparatus name: VHX-500). Aggregates and sizes thereof were determined in 50 visual fields each having dimensions of 3.1 mm×4.3 mm, and the dispersibility of the dried cellulose fibers in the resin was evaluated in accordance with the dispersion evaluation criteria shown in Table 3. The aggregates had a size of 200 μm or more in terms of maximum diameter.

TABLE 3

| | |
|---|---|
| AA | Fibers were extremely satisfactory dispersed (no aggregates were observed). |
| A | One to five aggregates were observed in a visual field of 1 cm². |
| B | Six to ten aggregates were observed in a visual field of 1 cm². |
| C | Eleven or more aggregates were observed in a visual field of 1 cm², or aggregates having a size of 300 μm or more were observed. |

Tensile Test

Tensile test was performed at 25° C. in accordance with JIS K7161 with a precision universal testing machine (manufactured by Shimadzu Corporation, apparatus name: Autograph AG-50KNXD) to determine the tensile strength, the tensile elastic modulus, and the strain. A test piece was prepared by injection molding as a predetermined dumbbell piece (JIS K7161) having an entire length of 150 mm, an edge width of 20 mm, a thickness of 3.25 mm, and a smaller width of 12.7 mm. The test conditions were set at a test speed of 10 mm/min and a gripping distance of 60 mm.

Example 1

Commercially available kraft pulp was used as a material cellulose to prepare a cellulose fiber water dispersion. First, the pulp was crushed with a cutting mill (manufactured by Fritsch, apparatus name: Pulverisette 15) to give cotton powder cellulose. The cotton powder cellulose was dispersed in ion-exchanged water to give a dispersion having a concentration of 10% by mass, and the dispersion was subjected to fibrillation treatment three times with a wet crusher (manufactured by Sugino Machine, apparatus name: Starburst) to fibrillate the fibers. The constituent sugar analysis, the molecular weight measurement, and the X-ray diffraction analysis were performed in a similar manner to that in Production Example 1. The 10% by mass cellulose fiber water dispersion was mixed with a condensed ricinoleic acid ester (product name: CRS-75, manufacturer: Sakamoto Yakuhin Kogyo Co., Ltd.) as a surfactant in an amount of 10 parts by mass relative to 100 parts by mass of the cellulose solid content, and the whole was thoroughly stirred and mixed.

The average fiber diameter and the particle size distribution were then determined in a similar manner to that in Production Example 1. The results are shown in Table 4. The same procedure as in Production Example 1 was performed to give dried cellulose fibers. Whether the obtained dried cellulose fibers had a fibrous form was examined with an electron microscope in a similar manner to that in Production Example 1, and a dried sample having a fibrous form was subjected to average fiber diameter measurement. The results are shown in Table 4.

Mixing with Polypropylene and Evaluation

At a mixing ratio shown in Table 4, cellulose fibers, maleic acid-modified polypropylene (product name: Umex Y-1010, manufacturer: Sanyo Chemical Industries, Ltd.), and polypropylene (product name: PX600N, manufacturer: SunAllomer Ltd.) were weighed, and the whole was stirred and mixed at 20,000 rpm for 1 minute by using a blender. The resulting mixture was melted and kneaded with a twin-screw kneader (manufactured by Xplore Instruments). The kneading conditions were 200° C. and 120 rpm, and the kneading time was 10 minutes. The kneaded material was subjected to injection molding, giving a cellulose fiber-resin composite as a predetermined dumbbell piece (JIS K7161). The dumbbell piece was conditioned for 7 days or more and was subjected to tensile test with a precision universal testing machine (manufactured by Shimadzu Corporation, product name: Autograph AG-50KNXD). The test conditions were set at a test speed of 10 mm/min and a gripping distance of 60 mm. The results of the mechanical properties (tensile strength, tensile elastic modulus, and strain) are shown in Table 4.

A strand obtained after kneading was cut into a length of about 3 mm, giving composite resin pellets. The composite resin pellets were interposed between Teflon (registered trademark) sheets and were pressed at 12 MPa and 200° C. for 2 minutes with a hot press machine, giving a resin press sheet. The resin press sheet was observed under a microscope to determine the presence of aggregates and sizes thereof, and the dispersibility in the resin was evaluated in accordance with the dispersion evaluation criteria shown in Table 3.

Example 2

The dried cellulose fibers in Production Example 1 were mixed with polypropylenes in a similar manner to that in Example 1, and the resulting composite was evaluated in a similar manner to that in Example 1.

Example 3

The same procedure as in Production Example 1 was performed except that the fibrillation treatment with the wet crusher was performed twice, giving dried cellulose fibers. Whether the obtained dried cellulose fibers had a fibrous form was examined with an electron microscope in a similar manner to that in Production Example 1, and the average fiber diameter and the like were determined (Table 4). The dried cellulose fibers were then mixed with polypropylenes in a similar manner to that in Example 1, and the resulting composite was evaluated in a similar manner to that in Example 1.

Comparative Example 1

As a comparative example of a resin product containing no dried cellulose fibers, only polypropylenes were mixed at a ratio shown in Table 4 to give a sample. A test piece was prepared in a similar manner to that Example 1 and was evaluated.

Comparative Example 2

FMa-10010 (manufactured by Sugino Machine, 10% by mass cellulose water dispersion) was used as a material. The subsequent steps were the same as in Production Example 1, and the constituent sugar analysis, the molecular weight measurement, the X-ray diffraction analysis, the average fiber diameter measurement, and the particle size distribution measurement were performed. The results are shown in Table 4.

The same procedure as in Production Example 1 was performed to give dried cellulose fibers. Whether the obtained dried cellulose fibers had a fibrous form was examined with an electron microscope in a similar manner to that in Production Example 1, and the average fiber diameter and the like were determined (Table 4). The dried cellulose fibers were then mixed with polypropylenes in a similar manner to that in Example 1, and the resulting composite was evaluated in a similar manner to that in Example 1.

Comparative Example 3

WFo-10010 (manufactured by Sugino Machine, 10% by mass cellulose water dispersion) was used as a material. The subsequent steps were the same as in Production Example 1, and the constituent sugar analysis, the molecular weight measurement, the X-ray diffraction analysis, the average fiber diameter measurement, and the particle size distribution measurement were performed. The results are shown in Table 4.

The same procedure as in Production Example 1 was performed to give dried cellulose fibers. Whether the obtained dried cellulose fibers had a fibrous form was examined with an electron microscope in a similar manner to that in Production Example 1, and the average fiber diameter and the like were determined (Table 4). The dried cellulose fibers were then mixed with polypropylene in a similar manner to that in Example 1, and the resulting composite was evaluated in a similar manner to that in Example 1.

Comparative Example 4

Cotton derived from raw cotton was used as a material cellulose to prepare a cellulose fiber water dispersion.

First, the cotton was crushed with a cutting mill (manufactured by Fritsch, apparatus name: Pulverisette 15) to give cotton powder cellulose. The cotton powder cellulose was not fibrillated with a wet crusher but was dispersed in ion-exchanged water to give a dispersion having a concentration of 10% by mass. The subsequent steps were the same as in Production Example 1, and the constituent sugar analysis, the molecular weight measurement, the X-ray diffraction analysis, the average fiber diameter measurement, and the particle size distribution measurement were performed. The results are shown in Table 4.

The same procedure as in Production Example 1 was performed to give dried cellulose fibers. Whether the obtained dried cellulose fibers had a fibrous form was examined with an electron microscope in a similar manner to that in Production Example 1, and the average fiber diameter and the like were determined (Table 4). The dried cellulose fibers were then mixed with polypropylenes in a similar manner to that in Example 1, and the resulting composite was evaluated in a similar manner to that in Example 1.

Comparative Example 5

A low fibrillation product of WFo-10010 (manufactured by Sugino Machine, 10% by mass cellulose water dispersion, fibrillated once) was used as a material. The subsequent steps were the same as in Production Example 1 to give a cellulose fiber water dispersion. In a similar manner to that in Production Example 1, the constituent sugar analysis, the molecular weight measurement, the X-ray diffraction analysis, the average fiber diameter measurement, and the particle size distribution measurement were performed. The results are shown in Table 4.

The same procedure as in Production Example 1 was performed to give dried cellulose fibers. Whether the obtained dried cellulose fibers had a fibrous form was examined with an electron microscope in a similar manner to that in Production Example 1, and the average fiber diameter and the like were determined (Table 4). The dried cellulose fibers were then mixed with polypropylene in a similar manner to that in Example 1, and the resulting composite was evaluated in a similar manner to that in Example 1.

TABLE 4

| | | Example 1 | Example 2 | Example 3 | Comparative Example 1 | Comparative Example 2 | Comparative Example 3 | Comparative Example 4 | Comparative Example 5 |
|---|---|---|---|---|---|---|---|---|---|
| Cellulose fibers | Average fiber diameter of cellulose fibers in water dispersion (μm) | 0.1 | 1.2 | 16.0 | — | 0.009 | 0.01 | 33.3 | 12.1 |
| | Hemicellulose content (%) | 33 | 1 | 1 | — | 4 | 51 | 1 | 51 |
| | Cellulose I crystalline form | | observed | | — | | observed | | |
| | Viscosity average molecular weight of cellulose fibers | 142,000 | 229,000 | 275,000 | — | 34,000 | 105,000 | 287,000 | 146,000 |
| | Median diameter (μm) | 22 | 24 | 48 | — | 6 | 13 | 61 | 34 |
| | Amount of surfactant to 100 parts by mass of cellulose fibers (parts by mass) | 10 | 10 | 10 | — | 10 | 10 | 10 | 10 |
| | Crushing | | performed | | — | | performed | | |
| | Fiber shape evaluation | A | A | A | — | D | D | C | D |
| | Average fiber diameter after drying (μm) | 0.2 | 1.3 | 19.4 | — | unmeasurable | unmeasurable | 37.6 | unmeasurable |
| Mixing ratio | Cellulose fiber content (% by mass) | 10 | 10 | 10 | — | 10 | 10 | 10 | 10 |
| | Maleic acid-modified PP (% by mass) | | 1 | | 1 | | 1 | | |
| | PP (% by mass) | | 89 | | 99 | | 89 | | |
| Test results | Dispersibility (resin press sheet) | A | AA | AA | — | A | C | A | C |
| | Tensile strength (MPa) | 38.5 | 41.3 | 40.8 | 32.5 | 35.4 | 36.1 | 38.5 | 36.6 |
| | Tensile elastic modulus (MPa) | 2,011 | 2,150 | 2,141 | 1,330 | 1,777 | 1,925 | 1,898 | 1,915 |
| | Strain (%) | 18.6 | 14.1 | 16.4 | 1,064 | 273.6 | 14.5 | 15.1 | 14.8 |

Example 4

Mixing with Polypropylene and Evaluation

The dried cellulose fibers in Production Example 1, maleic acid-modified polypropylene (product name: Umex Y-1010, manufacturer: Sanyo Chemical Industries, Ltd.), and polypropylene (product name: PX600N, manufacturer: SunAllomer Ltd.) were weighed at a mixing ratio shown in Table 5, and the whole was stirred and mixed at 20,000 rpm for 1 minute by using a blender. The resulting mixture was melted and kneaded with a twin-screw kneader (manufactured by Xplore Instruments). The kneading conditions were 200° C. and 120 rpm, and the kneading time was 10 minutes. The kneaded material was subjected to injection molding, giving a cellulose fiber-resin composite as a predetermined dumbbell piece (JIS K7161). The dumbbell piece was conditioned for 7 days or more and was subjected to tensile test with a precision universal testing machine (manufactured by Shimadzu Corporation, product name: Autograph AG-50KNXD). The test conditions were set at a test speed of 10 mm/min and a gripping distance of 60 mm. The results of the mechanical properties (tensile strength, tensile elastic modulus, and strain) are shown in Table 5.

A strand obtained after kneading was cut into a length of about 3 mm, giving composite resin pellets. The composite resin pellets were interposed between Teflon (registered trademark) sheets and were pressed at 12 MPa and 200° C. for 2 minutes with a hot press machine, giving a resin press sheet. The resin press sheet was observed under a microscope to determine the presence of aggregates and sizes thereof, and the dispersibility in the resin was evaluated in accordance with the dispersion evaluation criteria shown in Table 3. The prepared dumbbell piece had a cellulose fiber content of 1% by mass.

Example 5

The dried cellulose fibers in Production Example 1 were mixed with polypropylenes at a ratio shown in Table 5 in a similar manner to that in Example 4, and the resulting composite was evaluated in a similar manner to that in Example 4. The results of the mechanical properties (tensile strength, tensile elastic modulus, and strain) are shown in Table 5. The prepared dumbbell piece had a cellulose fiber content of 5% by mass.

Example 6

The dried cellulose fibers in Production Example 1 were mixed with polypropylenes at a ratio shown in Table 5 in a similar manner to that in Example 4, and the resulting composite was evaluated in a similar manner to that in Example 4. The results of the mechanical properties (tensile strength, tensile elastic modulus, and strain) are shown in Table 5. The prepared dumbbell piece had a cellulose fiber content of 20% by mass.

Example 7

The dried cellulose fibers in Production Example 1 were mixed with polypropylenes at a ratio shown in Table 5 in a similar manner to that in Example 4, and the resulting composite was evaluated in a similar manner to that in Example 4. The results of the mechanical properties (tensile strength, tensile elastic modulus, and strain) are shown in Table 5. The prepared dumbbell piece had a cellulose fiber content of 30% by mass.

TABLE 5

| | | Example 4 | Example 5 | Example 2 | Example 6 | Example 7 |
|---|---|---|---|---|---|---|
| Cellulose fibers | Average fiber diameter of cellulose fibers in water dispersion (μm) | | | 1.2 | | |
| | Hemicellulose content (%) | | | 1 | | |
| | Cellulose I crystalline form | | | observed | | |
| | Viscosity average molecular weight of cellulose fibers | | | 229,000 | | |
| | Median diameter (μm) | | | 24 | | |
| | Amount of surfactant to 100 parts by mass of cellulose fibers (parts by mass) | | | 10 | | |
| | Crushing | | | performed | | |
| | Fiber shape evaluation | | | A | | |
| | Average fiber diameter after drying (μm) | | | 1.3 | | |
| Mixing ratio | Cellulose fiber content (% by mass) | 1 | 5 | 10 | 20 | 30 |
| | PP (% by mass) | 98 | 94 | 89 | 79 | 69 |
| | Maleic acid-modified PP (% by mass) | 1 | 1 | 1 | 1 | 1 |
| Test results | Dispersibility (resin press sheet) | AA | AA | AA | A | A |
| | Tensile strength (MPa) | 35.1 | 36.8 | 41.3 | 40.7 | 46.4 |
| | Tensile elastic modulus (MPa) | 1,578 | 1,713 | 2,150 | 2,383 | 2,789 |
| | Strain (%) | 462 | 510 | 14.1 | 7 | 6 |

Example 8

Mixing with Nylon 6 and Evaluation

The dried cellulose fibers in Example 1 and nylon 6 (manufactured by Toray Industries Inc., Amilan CM1007) were weighed at a mixing ratio shown in Table 6, and the whole was stirred and mixed for 1 minute at 20,000 rpm by using a blender. After the stirring and mixing, the mixture was dried in an oven at 80° C. for 2 days to remove water. The dried mixture was melted and kneaded with a twin-screw kneader (manufactured by Xplore Instruments). The kneading conditions were 260° C. and 120 rpm, and the kneading time was 8 minutes. The kneaded material was subjected to injection molding, giving a predetermined dumbbell piece (JIS K7161). The dumbbell piece was conditioned for 7 days or more and was subjected to tensile test with a precision universal testing machine (manufactured by Shimadzu Corporation, product name: Autograph AG-50KNXD). The test conditions were set at a test speed of 10 mm/min and a gripping distance of 60 mm. The obtained results of the mechanical properties (tensile strength, tensile elastic modulus, and strain) are shown in Table 6. A strand obtained after kneading was cut into a length of about 3 mm, giving composite resin pellets. The composite resin pellets were interposed between Teflon (registered trademark) sheets and were pressed at 12 MPa and 260° C. for 2 minutes with a hot press machine, giving a resin press sheet. The resin press sheet was observed under a microscope to determine the presence of aggregates and sizes thereof, and the dispersibility in the resin was evaluated in accordance with the dispersion evaluation criteria shown in Table 3.

Example 9

Mixing with nylon 6 was performed in the same manner as in Example 8 except that the dried cellulose fibers in Example 2 were used as the dried cellulose fibers, and the resulting composite was evaluated in a similar manner to that in Example 8.

Example 10

Mixing with nylon 6 was performed in the same manner as in Example 8 except that the dried cellulose fibers in Example 3 were used as the dried cellulose fibers, and the resulting composite was evaluated in a similar manner to that in Example 8.

Comparative Example 6

As a comparative example of a resin product containing no dried cellulose fibers, only nylon 6 was used at a ratio shown in Table 6 to give a sample. A test piece was prepared in a similar manner to that in Example 8 and was evaluated.

Comparative Example 7

Mixing with nylon 6 was performed in the same manner as in Example 8 except that the dried cellulose fibers in Comparative Example 2 were used as the dried cellulose fibers, and the resulting composite was evaluated in a similar manner to that in Example 8.

Comparative Example 8

Mixing with nylon 6 was performed in the same manner as in Example 8 except that the dried cellulose fibers in Comparative Example 3 were used as the dried cellulose fibers, and the resulting composite was evaluated in a similar manner to that in Example 8.

Comparative Example 9

Dried cellulose fibers prepared in the same manner as in Comparative Example 4 were mixed with nylon 6 in a similar manner to that in Example 8, and the resulting composite was evaluated in a similar manner to that in Example 8.

TABLE 6

| | | Example 8 | Example 9 | Example 10 | Comparative Example 6 | Comparative Example 7 | Comparative Example 8 | Comparative Example 9 |
|---|---|---|---|---|---|---|---|---|
| Cellulose fibers | Average fiber diameter of cellulose fibers in water dispersion (μm) | 0.1 | 1.2 | 16.0 | — | 0.009 | 0.01 | 33.3 |
| | Hemicellulose content (% by mass) | 33 | 1 | 1 | — | 4 | 51 | 1 |
| | Cellulose I crystalline form | | observed | | — | | observed | |
| | Viscosity average molecular weight of cellulose fibers | 142,000 | 229,000 | 275,000 | — | 34,000 | 105,000 | 287,000 |
| | Median diameter (μm) | 22 | 24 | 48 | — | 6 | 13 | 55 |
| | Amount of surfactant to 100 parts by mass of cellulose fibers (parts by mass) | 10 | 10 | 10 | — | 10 | 10 | 10 |
| | Crushing | | performed | | — | | performed | |
| | Fiber shape evaluation | A | A | A | — | D | D | C |
| | Average fiber diameter after drying (μm) | 0.2 | 1.3 | 19.4 | — | unmeasurable | unmeasurable | 37.6 |
| Mixing ratio | Cellulose fiber content (% by mass) | | 10 | | — | | 10 | |
| | PP (% by mass) | | 90 | | 100 | | 90 | |
| Test results | Dispersibility (resin press sheet) | A | AA | AA | — | A | D | A |
| | Tensile strength (MPa) | 90.5 | 97.6 | 97.1 | 81.1 | 89.4 | 86.3 | 85.4 |
| | Tensile elastic modulus (MPa) | 2,932 | 4,238 | 3,213 | 2,456 | 2,872 | 2,775 | 2,928 |
| | Strain (%) | 6 | 4.7 | 6.1 | 91.2 | 6.4 | 5.5 | 6.1 |

The results reveal that the dried cellulose fibers having an average fiber diameter of 0.1 to 20 μm have high dispersibility in resins, and the resulting cellulose fiber-resin composites have higher tensile strength and higher tensile elastic modulus.

Example 11

Mixing with Nylon 6 and Evaluation

The dried cellulose fibers in Production Example 1 and nylon 6 (manufactured by Toray Industries Inc., Amilan CM1007) were weighed at a mixing ratio shown in Table 7, and the whole was stirred and mixed at 20,000 rpm for 1 minute by using a blender. After the stirring and mixing, the mixture was dried in an oven at 80° C. for 2 days to remove water. The dried mixture was melted and kneaded with a twin-screw kneader (manufactured by Xplore Instruments). Kneading was performed in conditions at 260° C. and 120 rpm for a kneading time of 8 minutes, and the kneaded material was subjected to injection molding, giving a predetermined dumbbell piece (JIS K7161). The dumbbell piece was conditioned for 7 days or more and was subjected to tensile test with a precision universal testing machine (Autograph AG-50KNXD manufactured by Shimadzu Corporation). The test conditions were set at a test speed of 10 mm/min and a gripping distance of 60 mm. The obtained mechanical properties (tensile strength, tensile elastic modulus, and strain) are shown in Table 7. The prepared dumbbell piece had a cellulose fiber content of 1% by mass.

Example 12

The dried cellulose fibers in Production Example 1 were mixed with nylon 6 at a ratio shown in Table 7 in a similar manner to that in Example 11, and the resulting composite was evaluated in a similar manner to that in Example 11. The prepared dumbbell piece had a cellulose fiber content of 5% by mass.

Example 13

The dried cellulose fibers in Production Example 1 were mixed with nylon 6 at a ratio shown in Table 7 in a similar manner to that in Example 11, and the resulting composite was evaluated in a similar manner to that in Example 11. The prepared dumbbell piece had a cellulose fiber content of 20% by mass.

Example 14

The dried cellulose fibers in Production Example 1 were mixed with nylon 6 at a ratio shown in Table 7 in a similar manner to that in Example 11, and the resulting composite was evaluated in a similar manner to that in Example 11. The prepared dumbbell piece had a cellulose fiber content of 30% by mass.

TABLE 7

|  |  | Example 11 | Example 12 | Example 10 | Example 13 | Example 14 |
|---|---|---|---|---|---|---|
| Cellulose fibers | Average fiber diameter of cellulose fibers in water dispersion (μm) |  |  | 1.2 |  |  |
|  | Hemicellulose content (%) |  |  | 1 |  |  |
|  | Cellulose I crystalline form |  |  | observed |  |  |
|  | Viscosity average molecular weight of cellulose fibers |  |  | 229,000 |  |  |
|  | Median diameter (μm) |  |  | 24 |  |  |
|  | Amount of surfactant to 100 parts by mass of cellulose fibers (parts by mass) |  |  | 10 |  |  |
|  | Crushing |  |  | performed |  |  |
|  | Fiber shape evaluation |  |  | A |  |  |
|  | Average fiber diameter after drying (μm) |  |  | 1.3 |  |  |
| Mixing ratio | Cellulose fiber content (% by mass) | 1 | 5 | 10 | 20 | 30 |
|  | PA (% by mass) | 99 | 95 | 90 | 80 | 70 |
| Test results | Dispersibility (resin press sheet) | AA | AA | AA | A | A |
|  | Tensile strength (MPa) | 86.0 | 88.6 | 97.6 | 112.0 | 99.7 |
|  | Tensile elastic modulus (MPa) | 2,626 | 2,998 | 4,238 | 4,036 | 4,238 |
|  | Strain (%) | 10.0 | 4.3 | 4.7 | 5.8 | 3.7 |

What is claimed is:

1. Dried cellulose fibers comprising:
cellulose fibers having an average fiber diameter of 1 μm or more and 20 μm or less and having a hemicellulose content of 5% or less in constituent sugar components; and
10% by mass or less of water, wherein
the cellulose fibers have a viscosity average molecular weight of 200,000 or more.

2. The dried cellulose fibers according to claim 1, wherein the cellulose fibers have cellulose I crystalline form.

3. The dried cellulose fibers according to claim 2, wherein the cellulose fibers have a viscosity average molecular weight of 300,000 or less.

4. The dried cellulose fibers according to claim 2, further comprising a surfactant.

5. The dried cellulose fibers according to claim 1, wherein the cellulose fibers have a viscosity average molecular weight of 300,000 or less.

6. The dried cellulose fibers according to claim 5, further comprising a surfactant.

7. The dried cellulose fibers according to claim 1, further comprising a surfactant.

8. The dried cellulose fibers according to claim 7, wherein the surfactant is at least one selected from the group consisting of stearic acid derivatives, oleic acid derivatives, glycerol derivatives, and polyglycerol derivatives.

9. The dried cellulose fibers according to claim 8, wherein the surfactant is contained in an amount of 1 part by mass or more and 30 parts by mass or less relative to 100 parts by mass of the cellulose fibers.

10. The dried cellulose fibers according to claim 7, wherein the surfactant is contained in an amount of 1 part by mass or more and 30 parts by mass or less relative to 100 parts by mass of the cellulose fibers.

11. A cellulose fiber-resin composite comprising:
the dried cellulose fibers according to claim 1; and
a thermoplastic resin.

12. The cellulose fiber-resin composite according to claim 11, wherein 5 or less aggregates of the dried cellulose fibers are contained in 1 cm2, and the aggregates have a maximum diameter of 200 μm or more.

13. The cellulose fiber-resin composite according to claim 12, wherein the thermoplastic resin is at least one selected from the group consisting of polyolefin resins and polyamide resins, and the dried cellulose fibers are contained in an amount of 1% by mass or more.

14. The cellulose fiber-resin composite according to claim 12, having a tensile elastic modulus of 1,550 MPa or more and a tensile strength of 36 MPa or more in accordance with JIS K7161.

15. A molded article formed from the cellulose fiber-resin composite according to claim 12.

16. The cellulose fiber-resin composite according to claim 11, wherein the thermoplastic resin is at least one selected from the group consisting of polyolefin resins and polyamide resins, and the dried cellulose fibers are contained in an amount of 1% by mass or more.

17. The cellulose fiber-resin composite according to claim 16, having a tensile elastic modulus of 1,550 MPa or more and a tensile strength of 36 MPa or more in accordance with JIS K7161.

18. The cellulose fiber-resin composite according to claim 11, having a tensile elastic modulus of 1,550 MPa or more and a tensile strength of 36 MPa or more in accordance with JIS K7161.

19. A molded article formed from the cellulose fiber-resin composite according to claim 11.

* * * * *